United States Patent
Paulsen et al.

(10) Patent No.: US 10,083,410 B2
(45) Date of Patent: Sep. 25, 2018

(54) METHOD AND SYSTEM FOR IMPLEMENTING A CLOUD BASED EMAIL DISTRIBUTION FAIRNESS ALGORITHM

(71) Applicant: Oracle International Corporation, Redwood Shores, CA (US)

(72) Inventors: Robert Paulsen, London (GB); Jacob Ofir, Toronto (CA); Andrew W. Robinson, North York (CA); Umair Akeel, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 398 days.

(21) Appl. No.: 14/490,553

(22) Filed: Sep. 18, 2014

(65) Prior Publication Data

US 2015/0081368 A1    Mar. 19, 2015

Related U.S. Application Data

(60) Provisional application No. 61/879,938, filed on Sep. 19, 2013.

(51) Int. Cl.
*G06Q 10/06* (2012.01)
*G06Q 30/02* (2012.01)

(52) U.S. Cl.
CPC ..... *G06Q 10/063114* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 7,979,296 B2 | 7/2011 | Kruse et al. | |
| 8,788,565 B2 | 7/2014 | Bevan | |
| 8,868,660 B2 | 10/2014 | Hastings et al. | |
| 9,633,399 B2 | 4/2017 | George et al. | |
| 9,654,638 B2 | 5/2017 | Waxman et al. | |
| 2003/0187909 A1* | 10/2003 | Le | G06F 9/5038 718/103 |
| 2003/0200145 A1* | 10/2003 | Krassner | G06Q 30/02 705/14.49 |
| 2007/0253375 A1* | 11/2007 | Hamilton | H04L 47/6225 370/336 |
| 2008/0317059 A1* | 12/2008 | Seigneurbieux | H04L 47/6215 370/417 |
| 2009/0113440 A1* | 4/2009 | Dorny | G06F 9/546 718/104 |
| 2009/0125319 A1* | 5/2009 | Craine | G06Q 10/10 705/1.1 |
| 2011/0292792 A1* | 12/2011 | Zuo | H04L 47/20 370/230 |

* cited by examiner

*Primary Examiner* — Kurtis Gills
*Assistant Examiner* — Akosua P Kyereme-Tuah
(74) *Attorney, Agent, or Firm* — Fish IP Law, LLP

(57) ABSTRACT

Disclosed is an approach for implementing a system, method, and computer program product for a marketing automation tool that implements an advanced fairness scheme for resources. The order that work items are deployed is carefully managed to ensure that customers are treated fairly. This prevents and/or minimizes any customer from being adversely affected by other customers.

25 Claims, 15 Drawing Sheets

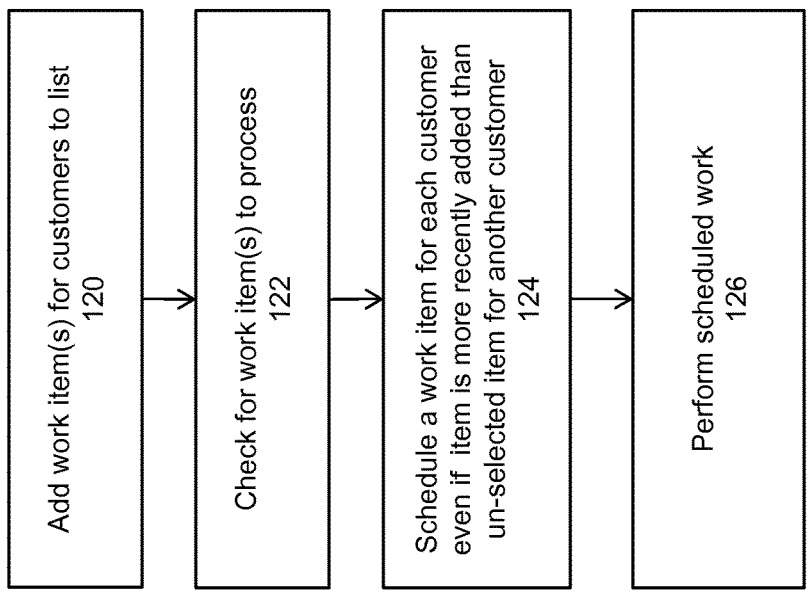

METHOD AND SYSTEM FOR IMPLEMENTING A CLOUD BASED EMAIL DISTRIBUTION FAIRNESS ALGORITHM

CROSS-REFERENCE TO RELATED APPLICATIONS

This application claims the benefit of priority to U.S. Provisional Application No. 61/879,938, filed on Sep. 19, 2013, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

Given the widespread availability and usage of the internet by consumers, many businesses have become interested in being able to effectively implement marketing solutions that can target consumers over the internet. To accomplish this, many marketers are now using marketing automation tools to target prospects, execute marketing campaigns, send leads to sales in real time, and to convert marketing leads into actual sales. An exemplary example of a commercially available marketing automation product is the Eloqua product, available from Oracle Corporation of Redwood Shores, Calif.

The marketing automation tool can be configured to perform many types of marketing functions, such as targeting, engagement, conversion, and analytics. The marketing automation tool can perform targeting, for example, by capturing data about prospects from online interactions and/or online behavior from website visits, downloads, social networks, and searches. This allows profiles to be constructed to more accurately provide content alignment in the marketing materials. Engagement can be implemented, for example, by using the marketing automation system to efficiently create campaigns, mapping a prospect's online behavior to display ad versions to individually target and personalize to the recipient, and by curating content from the prospect's trusted networks, and to tie social activities to leads, pipeline, and even revenue. Conversions can be facilitated by using the marketing automation system to implement better sales alignment, by aligning marketing and sales processes to boost revenue performance using profiles, content, and engagement. In addition, sales can be enabled by using pre-populated templates with consistent branded content that can be used to nurture and close deals. The marketing automation tool can also be used to provide analytics for the marketing activities, e.g., by using dashboards and closed-loop reporting tools. Marketing ROI (return on investment) can be obtained, for example, by measuring marketing return on investment and report on performance from major initiatives to individual campaigns. Benchmarking can also be performed, by measuring against other marketers.

An efficient way to implement such marketing automation solutions is by providing a cloud and/or SAAS (software as a service) approach, where a hosted system is provided to customers (e.g., marketers) to perform the marketing automation tasks. This is a software delivery model where software and its associated data are hosted using a cloud-based infrastructure. One of the biggest advantages for a company to use a cloud/SaaS-based approach is the great potential to reduce IT support costs by outsourcing hardware and software maintenance and support to the cloud/SaaS provider. Another key advantage is that the cloud/SaaS provider often has concentrated expertise in the product being delivered, allowing the company access to higher performing products and greater feature sets, while often usually paying less in overall costs.

The problem faced by the cloud/SaaS provider is that the computing resources are potentially being shared by multiple customers, and there is a need to ensure that each customer is allocated its fair share of the resources.

For example, consider when multiple customers seek to use the marketing automation tool to implement email marketing campaigns. In this scenario, each customer is implementing a marketing campaign that involves creation and distribution of a potentially very large number of emails to its marketing targets/prospects. The complication is that each of the multiple customers may have differing levels and fluctuations of usage needs for the computing resources, the customers may have different levels of contractual service guarantees that must be provided, and the usage needs may not be very predictable. Under these circumstances, it is often very difficult using conventional tools to ensure that each customer is given a fair share of the resources.

Embodiments of the present invention provide a system, method, and computer program product for implementing a marketing automation tool that provides an advanced fairness scheme for resources, where the order that work items are deployed is carefully managed to ensure that customers are treated fairly. The present invention prevents and/or minimizes any customer from being adversely affected by other customers. Additionally, the present approach avoids freezing the sequence of all known items at any point in time.

Other additional objects, features, and advantages of the invention are described in the detailed description, figures, and claims.

BRIEF DESCRIPTION OF FIGURES

FIG. 1B illustrates a flowchart of an example approach which may be employed in some embodiments of the invention to implement a marketing automation solution.

DETAILED DESCRIPTION

Embodiments of the present invention provide a system, method, and computer program product for implementing a marketing automation tool that implements an advanced fairness scheme for resources. In the invention, the order that work items are deployed is carefully managed to ensure that customers are treated fairly. The present invention prevents and/or minimizes any customer from being adversely affected by other customers. Additionally, the present approach avoids freezing the sequence of all known items at any point in time.

The embodiments of the invention are described illustratively below in the context of fairness when implementing email deployments. It is noted, however, that the invention may be applied to other types of functionality performed at a cloud/SaaS-based tool. Therefore, the invention is not deemed to be limited in it application only to email deployments or marketing automation tools unless specifically claimed as such.

Figure 1A:
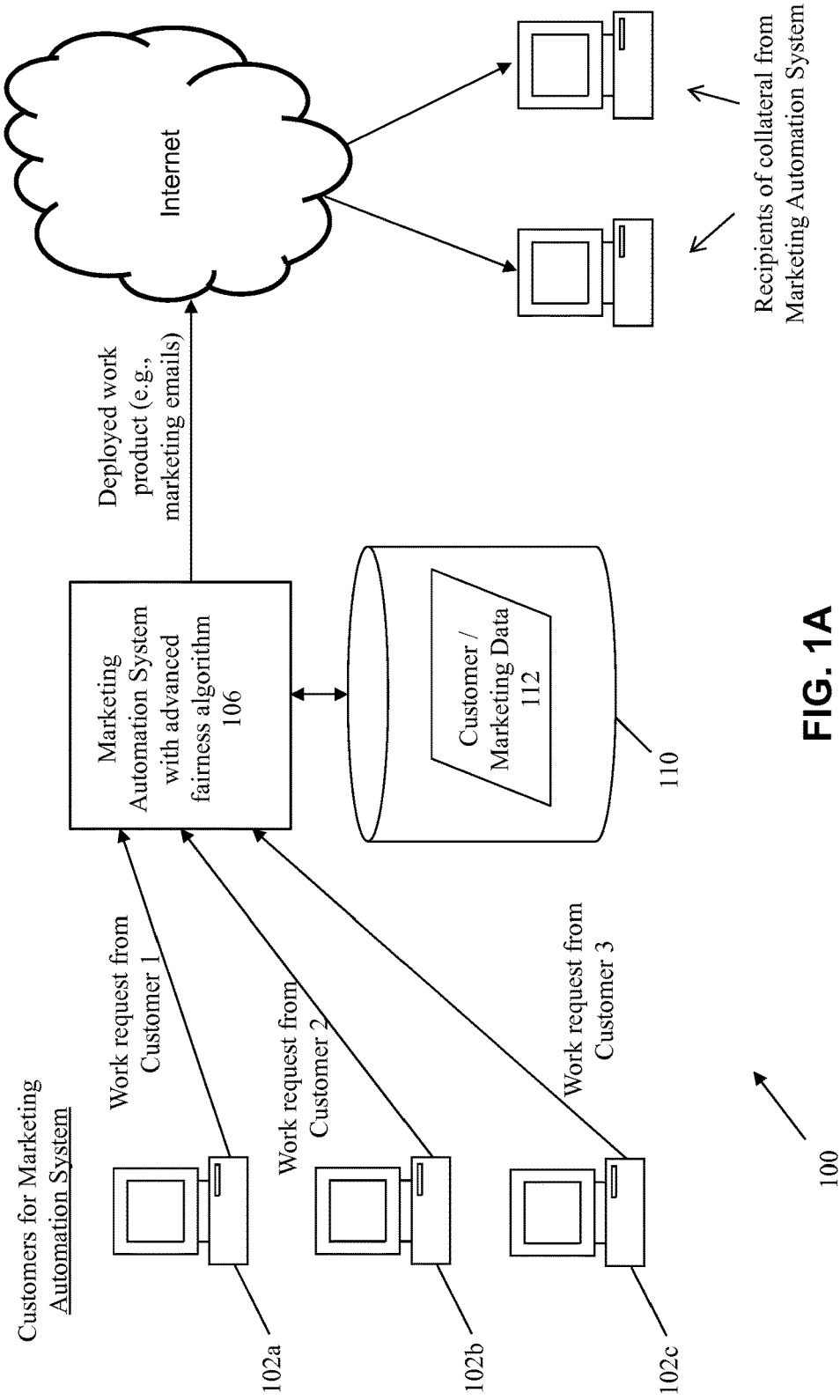
FIG. 1A illustrates an example system which may be employed in some embodiments of the invention to implement a marketing automation solution.

FIG. 1A illustrates an example system 100 which may be employed in some embodiments of the invention to implement a marketing automation solution. The system 100 includes one or more users at one or more user stations 102a, 102b, 102c that use the system 100 to operate and interact with the marketing automation tool 106. The user station comprises any type of computing station that may be used to operate or interface with the marketing automation applications in the system 100. Examples of such user stations include, for example, workstations, personal computers, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface.

The marketing automation tool 106 comprises any business and/or marketing related set of functionality that is accessible to users at the user stations 102a, 102b, and 102c. The marketing automation tool 106 may receive work requests from customers at each of these user stations. For example, the marketing automation tool 106 may receive work request to implement an email campaign from a customer 1 at user station 102a, work requests from a customer 2 at user station 102b, and work requests from a customer 3 at user station 102c.

The work requests (e.g., to perform the email marketing campaigns) may be implemented using customer/marketing data 112 stored into a database in a computer readable storage device 110. This data may include details and parameters for the marketing campaigns that have been established using the marketing automation tool 106. The data may also include data about the prospects/customers to which the emails will be sent as well as content for the emails.

The computer readable storage device 110 comprises any combination of hardware and software that allows for ready access to the data that is located at the computer readable storage device. For example, the computer readable storage device 110 could be implemented as computer memory operatively managed by an operating system. The computer readable storage device 110 could also be implemented as an electronic database system having storage on persistent and/or non-persistent storage.

The marketing automation system will process the work requests from the customers at the user stations 102a, 102b, and 102c to generate deployed work product that will be sent over the internet to recipients of the marketing materials at the recipients' user stations. The deployed work product could include, for example, emails generated according to the email marketing campaigns.

As discussed in more detail below, the marketing automation tool 106 operates using an advanced fairness algorithm to ensure that each of the customers 1-3 at the user stations 102a-c are allocated a fair share of the computing resources to perform the work requests.

For the purposes of explanation, one or more embodiments are illustratively described with reference to the marketing automation tool 106 being implemented as a cloud and/or SaaS product that is accessible to multiple customers from the user stations 102a, 102b, and 102c. It is noted, however, that the invention may be applied to other types of architectures as well, and is not to be limited to cloud/SaaS-based tools or marketing automation tools unless explicitly claimed as such. For example, the tool 106 may also be implemented as other types of enterprise applications that provide visibility and control over various aspects of a business. Such enterprise/business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples.

The creation of work items is largely uncontrolled and can often be quite "spikey", as individual customers can create many work items in a very small amount of time. If work items are deployed in the order they are created, then the occurrence of such spikes in the creation of work items would effectively delay all items created afterwards. To customers whose work items were created right after the spike, the delay would be quite noticeable. Additionally, as they have no insight into what other customers are doing, the delay would be perceived as a malfunction of the system.

To prevent this, the order that work items are deployed is carefully managed to ensure that customers are treated fairly. One concern of the inter-customer fairness is to prevent and/or minimize any customer from being adversely affected by other customers. Additionally, it is desirable to avoid freezing the sequence of all known items at any point in time, as new work items are constantly being created that may impact the theoretical "best" ordering of items already in the backlog.

FIG. 1B illustrates a flowchart of an approach to implement an advanced fairness scheme according to some embodiments of the invention. At 120, one or more work items are added to a list of work items. As noted above, the work items may appertain to any type of workload for a marketing automation system. For example, the work item may pertain to email customization work, where a marketing email is to be customized for a specific recipient. At 122, a check is made by the system of whether there are any work items waiting to be processed in the list of work items.

At 124, a work item is scheduled for each and every customer that has an eligible work item in the list. Therefore, each round of scheduling that is performed will select at least one work item for every customer represented in the list, regardless of when the work item was added to the list for that customer. This means for example that if there are two customers A and B, and customer A had added 1000 items to the list much earlier in time than a single item added by customer B, nonetheless the next round of scheduling will select at least one item for both customer A and customer B (even though this may leave 999 earlier unselected items in the list for customer A that pre-date the one selected item from customer B).

It is this approach of selecting at least one item for each customer in every round of scheduling that ensure that the occurrence of spikes in the creation of work items do not effectively delay all items created afterwards.

Thereafter, at 126, the scheduled work is performed by the system. This cycle repeats for each work item in the list. It is noted that while the flowchart shows a linear series of steps, any implementation of this process may actually have many or all of these steps performed concurrently by different parallel services.

Figure 2:
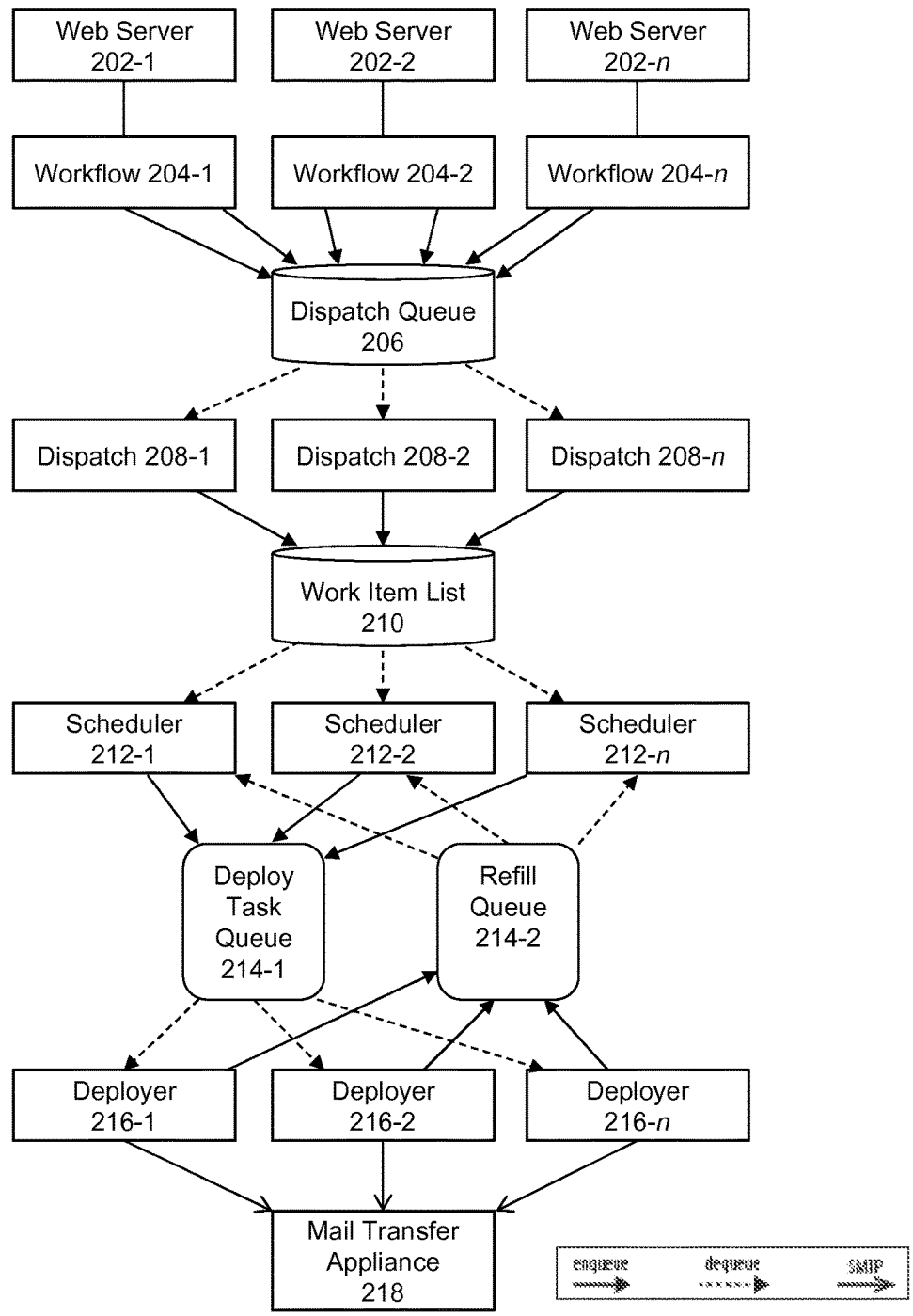
FIG. 2 provides a more detailed illustration of an architecture for implementing a marketing automation tool according to some embodiments of the invention.

FIG. 2 provides a more detailed illustration of an architecture for implementing a marketing automation tool according to some embodiments of the invention. In this architecture, there are many clients that originate work, but there are also many workers available to process the work.

Various parts of the marketing automation tool can be used to create and configure email deployments, e.g., using web servers 202-1, 202-2, . . . 202-n that generate workflows 204-1, 204-2, . . . 204-n. Various services within the marketing automation tool may be used to create the workflows, including components to build marketing programs and workflow execution components. These may also include user interfaces, as well as application programming interfaces (APIs) such as a REST (Representational State Transfer) API.

These new deployments are queued in a centralized Dispatch Queue 206. In one embodiment, each of the new deployments are represented as a single item in the dispatch queue 206. For example, one deployment of a large number of emails would still be represented as a single item in the queue.

A number of dispatch services poll the dispatch queue to select items from the queue. For example, dispatch 208-1, 208-2, . . . 208-n in the figure represent services that select items from the dispatch queue 206, e.g., on a first-in-first-out basis.

During the dispatch phase, deployments are broken into smaller work items. These smaller work items are then added to a centralized work item list 210. This represents the individual work items to be individually processed by workers in the system.

A number of scheduler services select items from the work item list 210 and queues them for deployment in the deploy task queue(s) 214-1. For example, schedulers 212-1, 212-2, . . . 212-n in the figure represent scheduler services that schedule items from the work item list 210. As previously described and as illustrated in more detail below, this selection process is responsible for enforcing throughput limits and inter-customer fairness. One or more tokens may be placed into the refill queue 214-2 to inform the scheduler services of the correct timing to select additional items from the work item list 210 and to place them into the deploy task queue 214-1.

The deployer services 216-1, 216-2, . . . 216-n subscribe to the deployment task queue(s). They are responsible for generating the emails to be sent out according to the email campaign. For example, the deployer services performs any required content merges and is responsible for deploying the resulting content over SMTP (simple mail transfer protocol) to a mail transfer appliance (MTA) 218. New items are selected only when the deployer services request more items via the refill request queue.

As noted above, creation of work items may be uncontrolled and may result in spikes in the workload. In fact, if work items are purely deployed in the order that they are created, then the occurrence of such spikes in the work items would delay all items created afterwards. This would be quite noticeable to the customers whose work items were created right after the spike. Therefore, the embodiments of the invention address this problem by managing the deployment of the work items to fairly treat all the customers, even ones that create work item after such a spike occurs.

In some embodiments, each customer is allocated a set of tokens that allow the customer to place work onto the work list. The quantity of tokens allocated to a customer is dependent in some cases upon the service level agreements contracted to the customer.

For each round of scheduling, the scheduler will take one item of work for each customer that currently has work pending in the work queue. The workers that handle deployment will take work request from the work queue and operate upon that work. The worker will also add a special communications device back onto the refill queue to indicate to the scheduler that more work should be placed into the work queue.

To illustrate this, the following scenario describes a situation where four customers (Customers 1, 2, 3, and 4) are creating work items to be deployed. The items arrive in groups as each customer creates them, and therefore need re-ordering. As is typical in the real world, work from Customer 4 is added after scheduling has already begun. Therefore, the initial scenario only includes items in the work list from Customers 1, 2, and 3.

Figure 3:
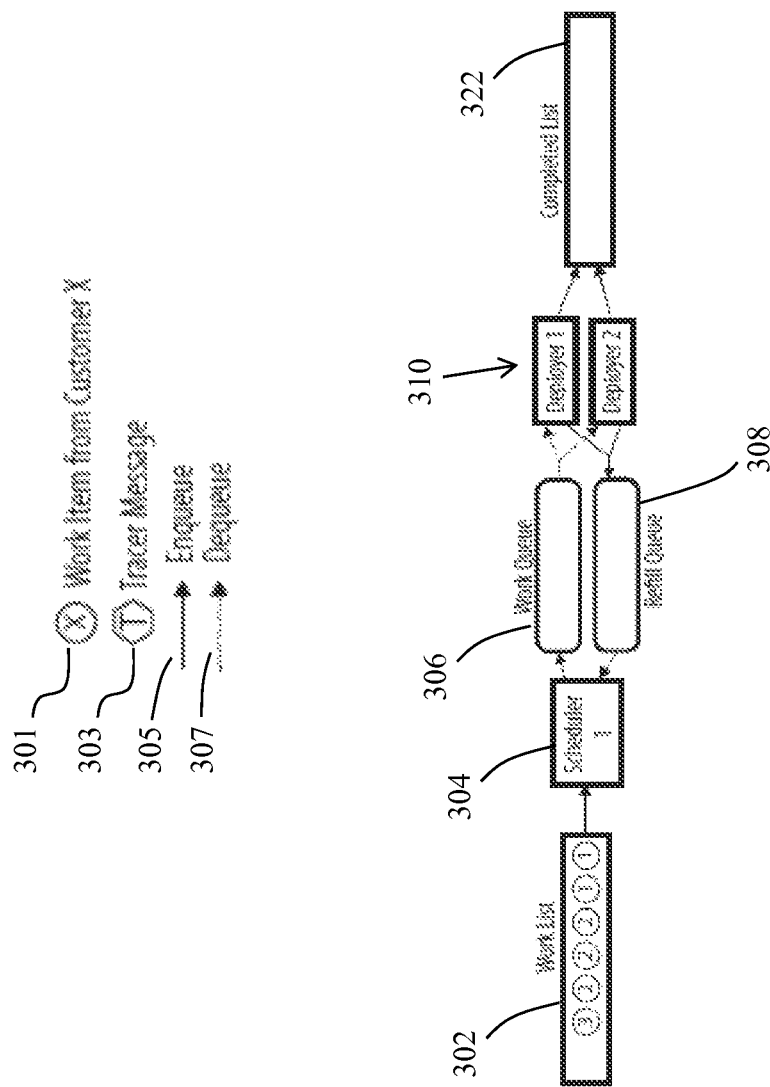
FIGS. 3-13 illustrate an example scenario.

In the diagrams of FIGS. 3-13 described below, the work list 302 includes a listing of the work items to be processed at that particular point in time, with the items in the right side of the work list 302 being the oldest (left to right ordering of youngest to oldest). The completed list 322 includes the items that have been completed, with items on the right being completed first (left to right ordering of youngest to oldest). The top of FIG. 3 shows a set of symbols that are used in the figures, including symbol 301 that represents a work item from a given customer, symbol 303 that represents a tracer message, symbol 305 that represents an enqueue, and symbol 307 that represents a dequeue.

In these figures, FIG. 3 illustrates the initial state of the scenario. Here, at the beginning of the scenario, the work list 302 is populated with items from Customers 1, 2, and 3. There are currently six items in the work list, representing one item from Customer 3 (the item marked with the number "3"), three items from Customer 2 (the three items marked with the number "2"), and two items from Customer 1 (the two items marked with the number "1"). The ordering of these items is (3, 2, 2, 2, 1, 1). As previously noted, the work list 302 is organized with left to right ordering of youngest to oldest items. Therefore, the two items from Customer 1 are the oldest, followed by the three items from Customer 2, with the one item from Customer 3 being the least-old item in the list.

It is noted that there are no items currently available to the deployer service 310 to operate upon (since there are no items in the work queue 306). It is also noted that Customer 4 has not yet placed any items into the list 302 for processing.

Figure 4:
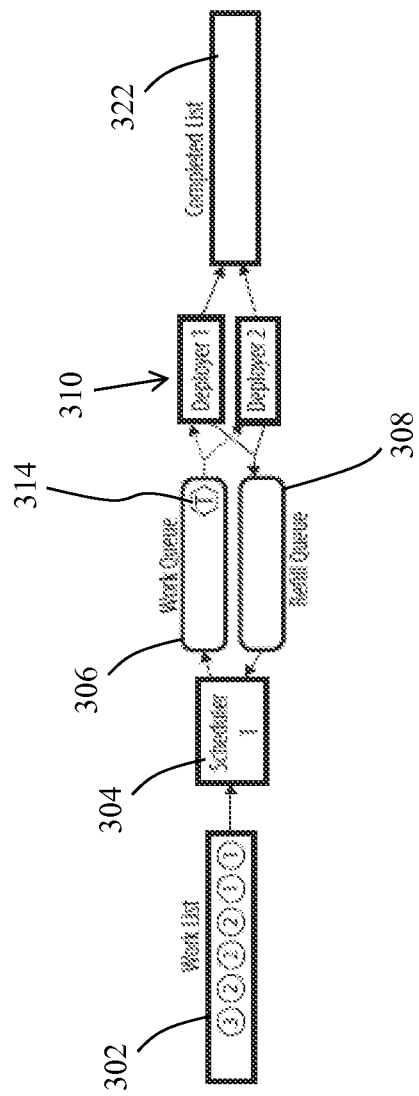

Next, the queues 306, 308 are to be primed to allow work to be processed. A communications mechanism referred herein as the "Tracer" message 314 is used to indicate to the scheduler 304 to add items to the work queue 306. In some embodiments, the scheduler service 304 will only select items from the work list 302 when it receives a Tracer message 314 via the refill queue 308 from the deployer services 310. When there is no work to be done, the scheduler 304 periodically will create its own Tracer task 314, which is sent to the deployer service 310 via the work queue 306, e.g., as shown in FIG. 4.

Figure 5:
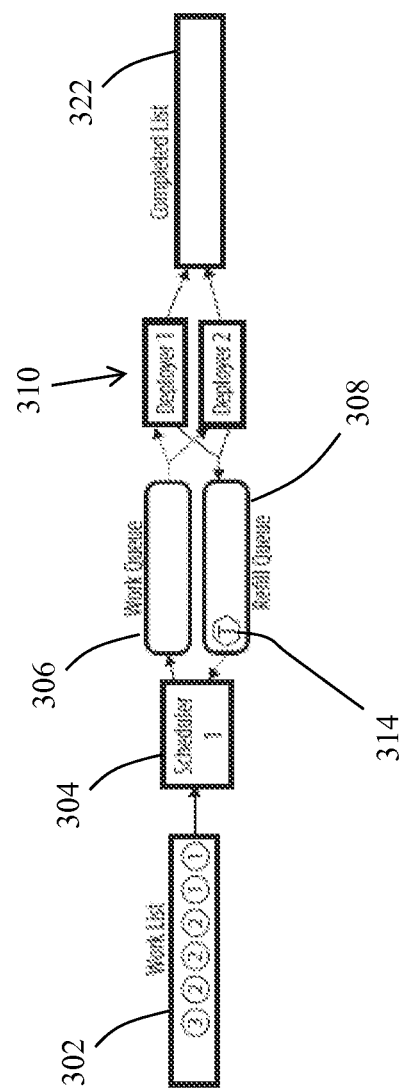

A deployer service 310 that is listening on the work queue 306 will receive the Tracer item 314. At this point, the only work too be done with this task is to return the Tracer 314 through the refill queue 308, as shown in FIG. 5.

One of the schedulers 304 will be listening on the refill queue 308 and will receive the Tracer 314. This indicates to the scheduler 304 to refill the work queue 306 with another round of items from the work list 302.

Each time the scheduler 304 is asked to refill the work queue 306, it will select one item from each customer with eligible items in the work list 302. In the current situation, there are currently six items in the work list 302, representing items from Customer 3, Customer 2, Customer 2, Customer 2, Customer 1, and Customer 1 (3, 2, 2, 2, 1, 1). As previously noted the work list 302 is organized with left to right ordering of youngest to oldest items. Therefore, the two items from Customer 1 are the oldest, followed by the three items from Customer 2, with the one item from Customer 3 being the least-old item in the list.

Figure 6:
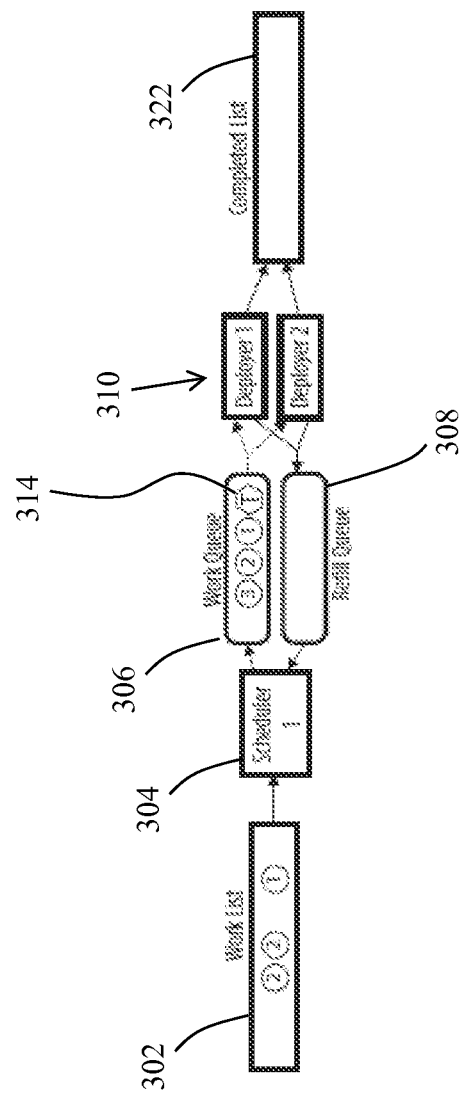

Here, as shown in FIG. 6, the earliest items from each of the Customers 1, 2, and 3 are selected and placed into the work queue 306. This means that the other items from Customers 1 and 2 are not selected, even though they are actually older than the item from Customer 3. It is this scheme that ensure that the occurrence of spikes in the creation of work items do not effectively delay all items created afterwards. It is noted that a Tracer 314 is also placed into the work queue 306 prior to the items from the Customers.

Figure 7:
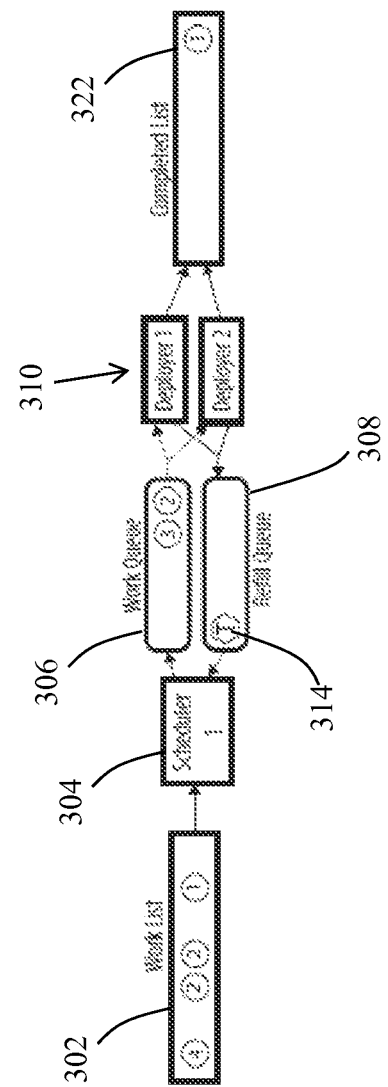

As shown in FIG. 7, the deployers 310 will process work by selecting tasks from the work queue 306. Here, one of the deployers 310 has first processed a task by simply taking the Tracer 314 from the queue 306 and returning it back to the scheduler 304 via the refill queue 308. The other deployer 310 executes the task from Customer 1, indicating that the task is completed by placing that item into the completed list 322. This continues until the tasks in the work queue 306 have all be processed and placed onto the completed list 322.

It is noted that in the interim, an item from Customer 4 has since been added to the work list 302. This means that the work list 302 now currently included four items, representing items from Customer 4, Customer 2, Customer 2, and Customer 1 (4, 2, 2, 1). As previously noted the work list 302 is organized with left to right ordering of youngest to oldest items. Therefore, the item from Customer 1 is the oldest, followed by the two items from Customer 2, with the one item from Customer 4 being the least-old item in the list 302.

Figure 8:
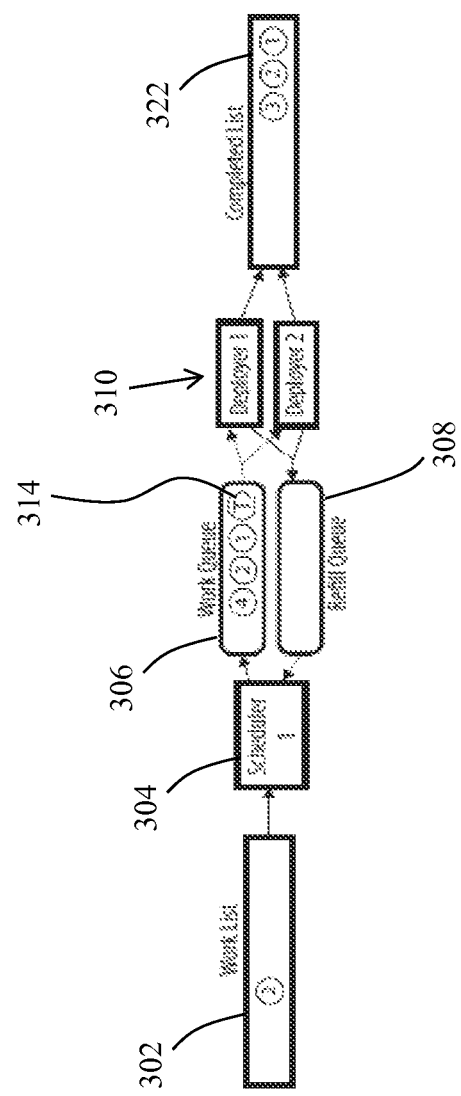

Upon receiving the Tracer 314, the scheduler 304 will select the next round. As previously noted, each time the scheduler 304 is asked to refill the work queue 306, it will select one item from each customer with eligible items in the work list. Here, the scheduler 304 will select an item from Customers 1, 2, and 4, as shown in FIG. 8. It is noted that Customer 4's item is selected ahead of the additional item from Customer 2, ensuring that Customer 4 is not impacted by Customer 2's backlog of items in the list. This prevents the situation where if all items in the work list had already been sequenced ahead of actual execution time, then Customer 4's item would have necessarily been queued after all pre-existing items.

Figure 9:
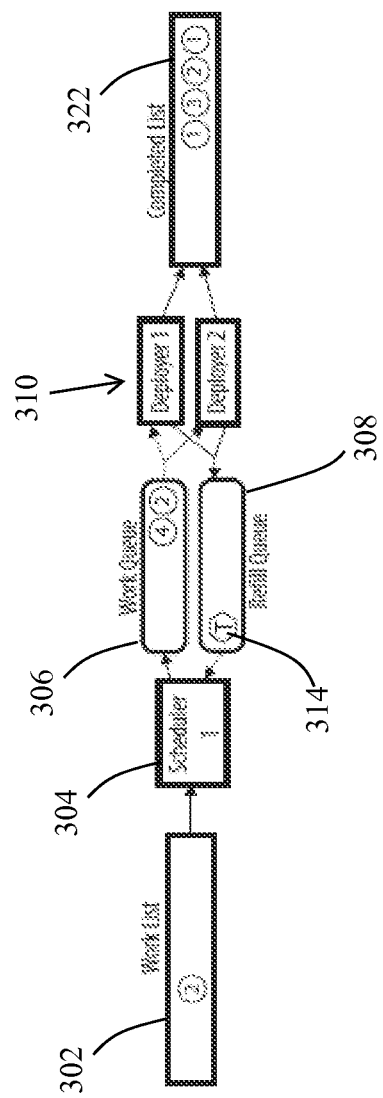

As shown in FIG. 9, once the deployer service 310 starts to process the tasks in the work queue 306, one of the deployers 310 will again return the Tracer 314 back to the scheduler 304 using the refill queue 308. It is noted that the request for more items will come before the queue 306 has been emptied, ensuring that the deployer service 310 will not be idle waiting for new items to be scheduled.

Figure 10:
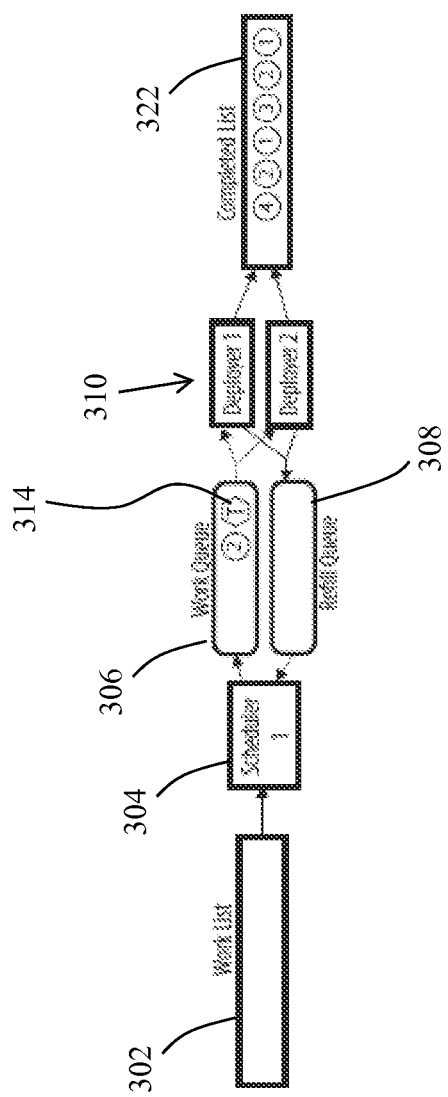

As shown in FIG. 10, the next round of scheduling causes the last available item to be selected and queued, preceded by a Tracer task 314. The deployer service 310 also completes the two items from FIG. 9 that were already in the queue 306.

Figure 11:
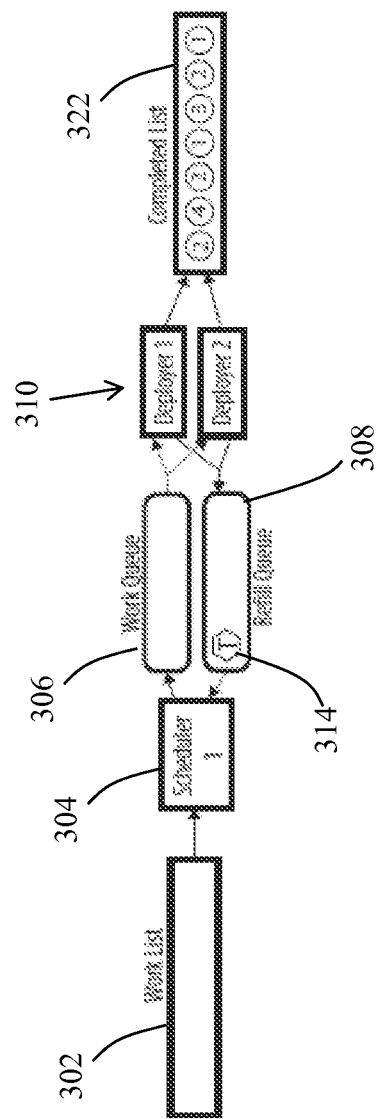
Figure 12:
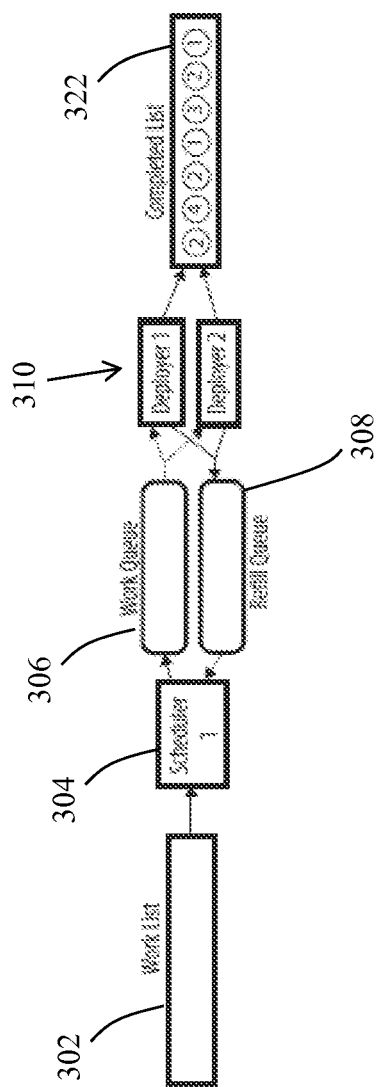

The scheduler 304 will receive the Tracer message 314 and will again select the next round, as shown in FIG. 11. However, at this point, the work list 302 is now empty. Therefore, there are no further items to be queued. As shown in FIG. 12, a Tracer task is also not queued, as it would only be immediately returned causing a tight loop of continuous activity. Instead, the scheduler 304 will wait a period of time before adding a Tracer task, resulting in a new selection round.

In a production environment, there is likely to be multiple active scheduler services, so that the actual time between selection attempts on an empty list would be quite small. This ensures that there is not a significant delay for the first item that is added.

Figure 13:
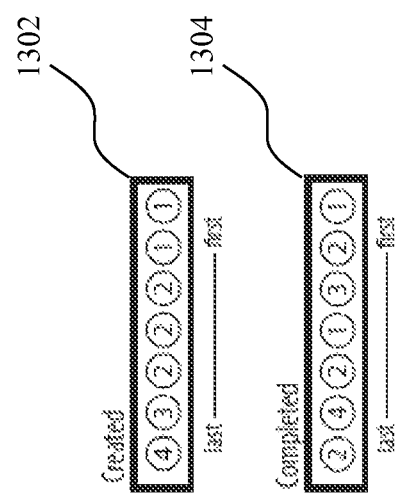

FIG. 13 illustrates that the creation order does not necessarily match the completion order of the work items. The re-sequencing of items is most evident when directly comparing the creation order 1302 with the eventual completion order 1304. While the items were created in bursts from each customer, the resulting execution saw their completion interwoven with items from different customers. This does mean that the customers with items created first will wait longer than otherwise. However, steady progress will still be seen against their backlog throughout the process, with the initial items picked up promptly and subsequent items completed at regular intervals. The amount of the delay (if any) is governed by the overall backlog in the system, it is shared equally amongst all customers.

The previous scenario outlined how the scheduler sequences eligible work items. The embodiments of the invention also provide an approach for determining why a given work item may or may not be considered "eligible".

Each customer is given a conceptual bucket that can hold a certain number of tokens (and may be configured in some embodiments to hold no more). When an item is selected from the work list by the scheduler service, tokens are deducted from the customers bucket. The amount of tokens deducted is equal to the number of recipients of the work item. If the customer does not have enough tokens to cover the number of recipients, the work item will not be selected that round.

New tokens are periodically given to each customer according to their email throughput limits. If, for example a customer is allowed 36,000 emails an hour, then that customer will be given 600 tokens every minute, or 10 tokens a second. The customer can continue to acquire tokens, e.g., until the customer has reached a maximum limit.

The size of the bucket governs the "burstability" of a customer's email throughput. Since a customer's work items will be selected so long as they have sufficient tokens, a large bucket would mean that many work items can be sent without the tokens needing to be replenished. A customer with a 500,000 token bucket can send a burst of 500,000 emails in a short period of time, regardless of how fast they are receiving new tokens. However, since the tokens are replenished according to the customer's configured throughput limits, then over time the customer will not be able to beat those hourly limits. If the customer is receiving tokens at a rate of 10,000 an hour, it will take the customer over two days to fully refill their bucket (and allowing them to send another burst).

This, however, highlight one of the advantages of this invention, which allows the customer to select the level of burstiness for the work. Given the limitations of the number of tokens possessed by the customer, the customer can choose to expend the tokens in a very bursty way by sending a large amount of emails in a very short period of time. In contrast, the customer is also able to space out the work so that it is less bursty.

In many cases, a customer does not only care about sending occasional bursts, but prefer overall throughput as well. Since new tokens are given regularly and at short intervals (e.g., over seconds), an average customer may have a bucket that is approximately one tenth their hourly limits. This allows the customer to keep burstability low, but still allows the customer to send emails as per their hourly rate.

However, since different customers have different needs, both the rate of tokens given and the size of the bucket are configurable per customer, with appropriate defaults set at the various product trims.

Therefore, what has been described is an approach for implementing a system, method, and computer program product for marketing automation which includes an advanced fairness scheme. The order that work items are deployed is carefully managed to ensure that customers are treated fairly. The present invention prevents and/or minimizes any customer from being adversely affected by other customers. Additionally, the present approach avoids freezing the sequence of all known items at any point in time.

In some embodiments, each customer is allocated a set of tokens that allow the customer to create eligible work. For each round of scheduling, the scheduler will take one item of work for each customer that currently has work pending in the work queue. The workers that handle deployment will take work request from the work queue and operate upon that work. The worker will also add a special communications device back onto the refill queue to indicate to the scheduler that more work should be placed into the work queue.

Each time the scheduler is asked to refill the work queue, it will select one item from each customer with eligible items in the work list. This ensures that a customer that later adds an item is not impacted by the backlog of items in the list from an earlier customer. This prevents the situation where if all items in the work list had already been sequenced ahead of actual execution time, then the later customer's item would have necessarily been queued after all pre-existing items.

This approach therefore addresses and solves problems pertaining to the creation of work items is largely uncontrolled and which can be spikey. Work items do not necessarily need to be deployed in the order they are created, thereby solving the problem of spikes that occur in the creation of work items. To customers whose work items were created right after the spike, delays would no longer exist and/or be noticeable.

System Architecture Overview

Figure 14:
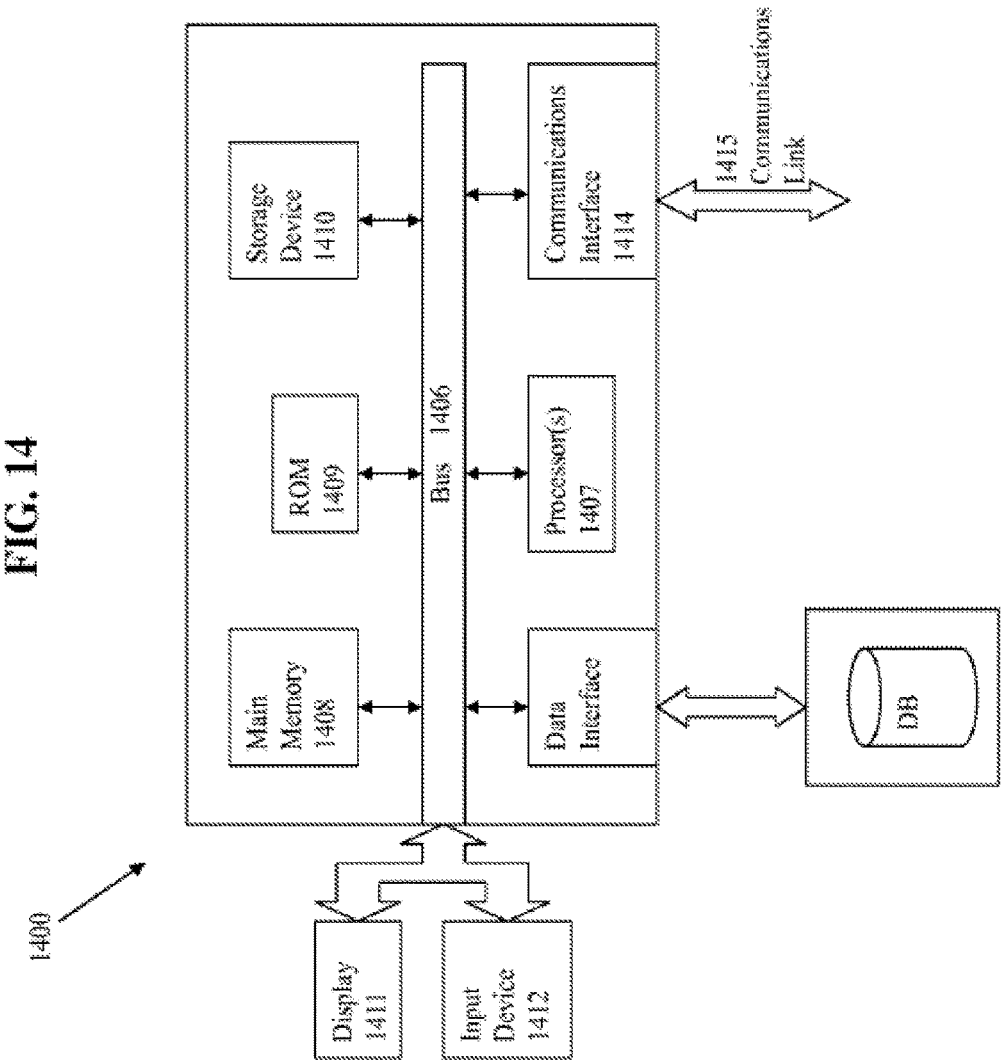
FIG. 14 shows an architecture of an example computing system with which the invention may be implemented.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of minimizing execution time implemented with a processor, comprising:
adding work items submitted by multiple entities to a work list data structure saved on a computer-readable medium representing a work list in a computing system, wherein the work items comprise messages to be customized for recipients of the messages;
repeatedly outputting work items from the work list data structure to a deploy task queue via a plurality of work distribution rounds utilizing a scheduler, wherein each of the plurality of work distribution rounds comprises the steps of:

selecting a set of oldest work items for each eligible entity from the work list data structure, wherein the selected set of oldest work items For each eligible entity is older than any unselected work item for the respective eligible entity, removing the selected work items from the work list data structure, and outputting the selected work items to the deploy task queue, wherein during at least one of the plurality of work distribution rounds, at least two of the multiple entities are eligible entities, at least two of the selected work items from different eligible entities are moved from the work list data structure to the deploy task queue, and at least one of a first set of selected oldest work items for a first entity of the multiple entities is younger than a second set of unselected work items for a second entity of the multiple entities; processing the work items in the deploy task queue with deployers that customize messages of the deploy task queue work items based at least in part on data specific to recipients of the messages; and sending the customized messages to the recipients.

2. The method of claim 1, further comprising determining whether an entity is eligible based at least in part on an availability of tokens for the entity.

3. The method of claim 2, wherein the tokens allocated to an entity correspond with a number of recipients of the work item.

4. The method of claim 2, wherein a number of the set of oldest work items for an eligible burst entity within a round of the plurality of work distribution rounds is configurable by adjusting the rate at which the tokens are consumed by the eligible burst entity.

5. The method of claim 1, wherein the deploy task queue comprises a FIFO queue that deploys scheduled work items in the order that work items were added to the FIFO queue.

6. The method of claim 1, further comprising deploying a tracer to a refill queue after each of the scheduled work items moved during a same work distribution round is deployed, and wherein each of the plurality of work distribution rounds further comprises moving the selected work items only when the tracer is deployed.

7. The method of claim 1, wherein any of the actions of adding the work items to the work list, checking the work list, scheduling, or performing scheduled work items is performed in parallel.

8. The method of claim 1, wherein at least one of the plurality of work distribution rounds does not add a work item assigned to a specific entity of the multiple entities and at least one other of the plurality of work distribution rounds adds a work item assigned to the specific entity of the multiple entities.

9. The method of claim 1, wherein the entities correspond to customers of a hosted computing system.

10. A non-transitory computer readable medium having stored thereon a sequence of instructions which, when executed by a processor causes the processor to execute a method, the method comprising:

adding work items submitted by multiple entities to a work list data structure saved on a computer-readable medium representing a work list in a computing system, wherein the work items comprise messages to he customized for recipients of the messages;

repeatedly outputting work items from the work list data structure to a deploy task queue via a plurality of work distribution rounds utilizing a scheduler, wherein each of the plurality of work distribution rounds comprises the steps of:

selecting a set of oldest work items for each eligible entity from the work list data structure, wherein the selected set of oldest work items For each eligible entity is older than any unselected work item for the respective eligible entity, removing the selected work items from the work list data structure, and outputting the selected work items to the deploy task queue, wherein during at least one of the plurality of work distribution rounds, at least two of the multiple entities are eligible entities, at least two of the selected work items from different eligible entities are moved from the work list data structure to the deploy task queue, and at least one of a first set of selected oldest work items for a first entity of the multiple entities is younger than a second set of unselected work items for a second entity of the multiple entities; processing the work items in the deploy task queue with deployers that customize messages of the deploy task queue work items based at least in part on data specific to recipients of the messages; and sending the customized messages to the recipients.

11. The non-transitory computer readable medium of claim 10, wherein the method further comprises determining whether an entity is eligible based at least on part on an availability of tokens for the entity.

12. The non-transitory computer readable medium of claim 11, wherein the tokens allocated to the entity correspond with a number of recipients of the work item.

13. The non-transitory computer readable medium of claim 11, wherein a number of the set of oldest work items for an eligible burst entity within a round of the plurality of work distribution rounds is configurable by adjusting the rate at which the tokens are consumed by the eligible burst entity.

14. The non-transitory computer readable medium of claim 10, wherein the deploy task queue comprises a FIFO queue that deploys scheduled work items in the order that work items were added to the FIFO queue.

15. The non-transitory computer readable medium of claim 10, wherein themethod further comprises deploying a tracer to a refill queue after each of the scheduled work items moved during a same work distribution round is deployed, and wherein each of the plurality of work distribution rounds further comprises moving the selected work items only when the tracer is deployed.

16. The non-transitory computer readable medium of claim 10, wherein any of the actions of adding the work items to the work list, checking the work list, scheduling, or performing scheduled work items is performed in parallel.

17. The non-transitory computer readable medium of claim 10, wherein at least one of the plurality of work distribution rounds does not add a work item assigned to a specific entity of the multiple entities and at least one other of the plurality of work distribution rounds adds a work item assigned to the specific entity of the multiple entities.

18. The non-transitory computer readable medium of claim 10, wherein the entities correspond to customers of a hosted computing system.

19. A computing system, comprising:

a work list implemented using a computer readable medium, the work list implemented as a data structure in the system to hold work items, wherein each work item is submitted by an entity of a plurality of entities;

one or more schedulers that repeatedly outputs work items from the work list via a plurality of work distribution rounds, wherein each of the plurality of work distribution rounds comprises the steps of:

selecting at least one set of oldest work items for each eligible entity of the plurality of entities, wherein the selected set of oldest work items for each eligible entity is older than any unselected work item for the respective eligible entity, removing the selected work items from the work list, outputting the selected work items;

a deploy task queue, wherein scheduled work items from each work distribution round are placed into the deploy task queue, and wherein the work items comprise messages to be customized for recipients of the messages; and one or more deployers to process the scheduled work items from the deploy task queue by customizing messages of the scheduled work items based at least in part on data specific to recipients of the messages and by sending the customized messages to the recipients, wherein during at least one of the plurality of work distribution rounds, at least two of the multiple entities are eligible entities, at least two of the selected work items from different eligible entities are moved from the work list to the deploy task queue, and one or more of a first set of selected oldest work items for a first entity of the plurality of entities is younger than a second set of unselected work items for a second entity of the plurality of entities.

20. The computing system of claim 19, further comprising one or more dispatch services that dispatch the work items into the work list from a dispatch queue.

21. The computing system of claim 19, further comprising one or more web servers to generate workflows that produce the work items.

22. The computing system of claim 21, wherein the one or more web servers correspond to components to build marketing programs or to workflow execution components.

23. The computing system of claim 19, further comprising a refill request queue to request more items to be scheduled.

24. The computing system of claim 23, in which a tracer object is placed into the refill request queue to request more items to be scheduled.

25. The system of claim 19, wherein the entities correspond to customers of a hosted computing system.

* * * * *

UNITED STATES PATENT AND TRADEMARK OFFICE
CERTIFICATE OF CORRECTION

PATENT NO.       : 10,083,410 B2
APPLICATION NO.  : 14/490553
DATED            : September 25, 2018
INVENTOR(S)      : Robert Paulsen et al.

Page 1 of 1

It is certified that error appears in the above-identified patent and that said Letters Patent is hereby corrected as shown below:

In the Specification

In Column 10, Line 33, delete "PTSN" and insert -- PSTN --

In the Claims

In Column 11, Line 3, delete "For" and insert -- for --

In Column 11, Line 64, delete "he" and insert -- be --

In Column 12, Line 6, delete "For" and insert -- for --

In Column 12, Line 46, delete "themethod" and insert -- the method --

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*